J. H. KING.
MILK PAIL.
APPLICATION FILED JAN. 3, 1913.
1,060,100.
Patented Apr. 29, 1913.
2 SHEETS—SHEET 2.
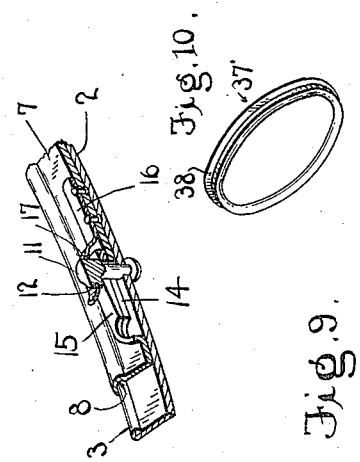
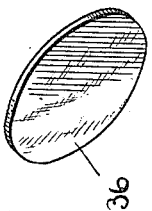
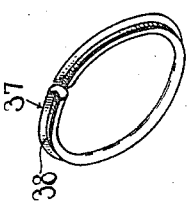
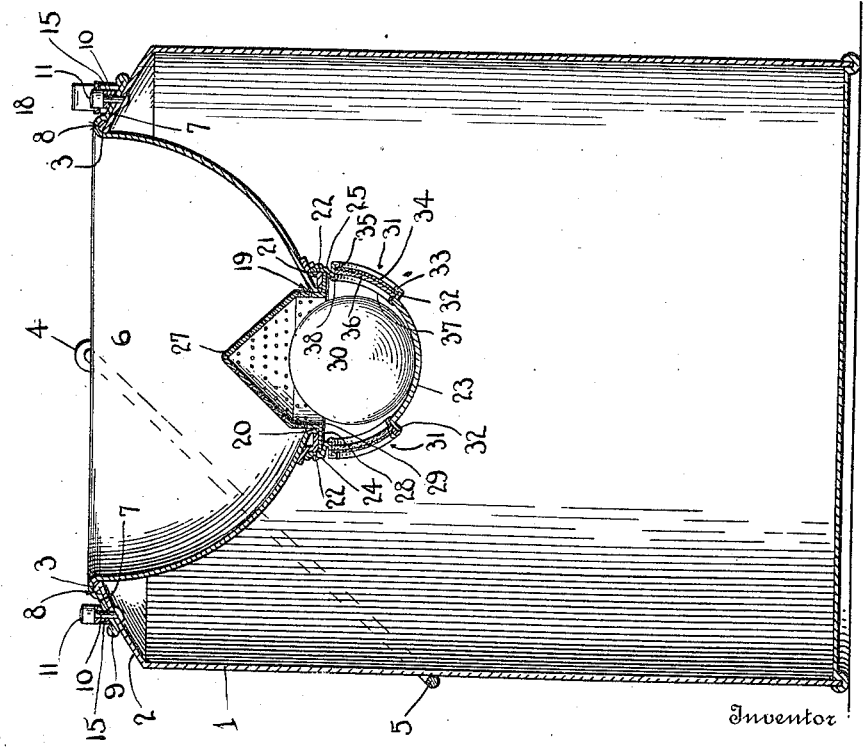
Witnesses
L. B. James
C. E. Hunt
Inventor
J. H. King
By H. B. Willson & Co.
Attorneys

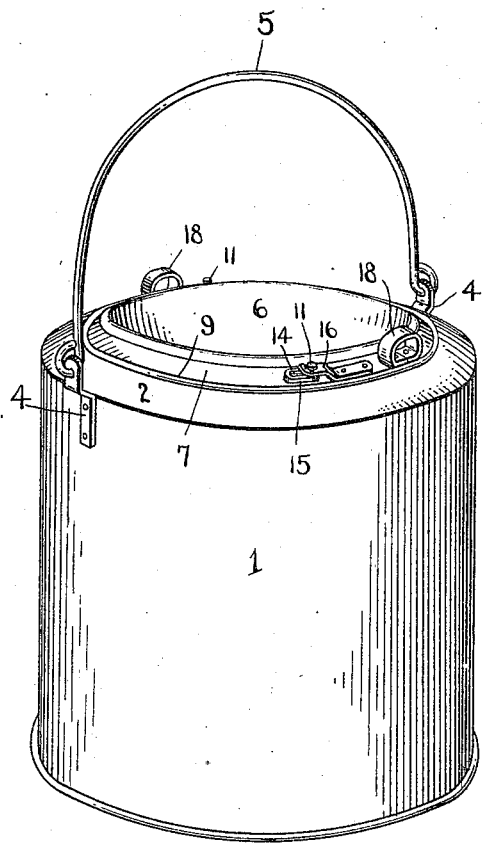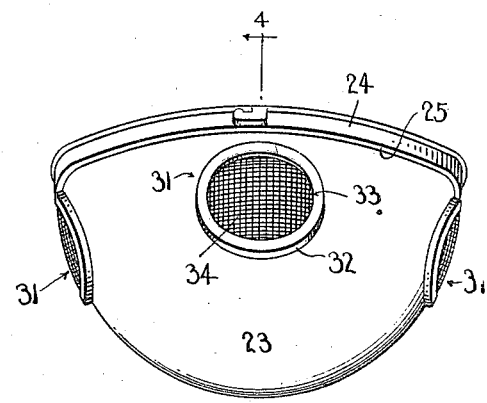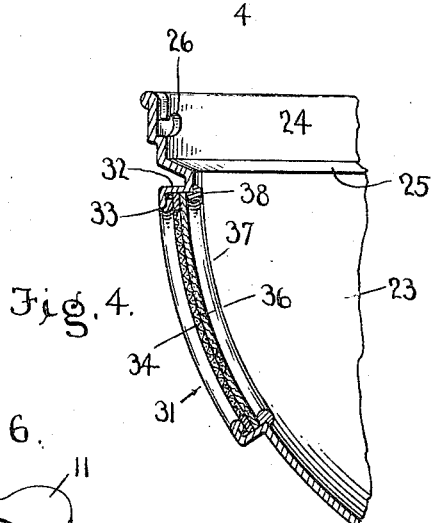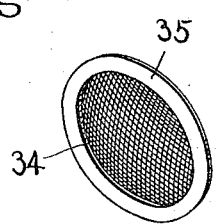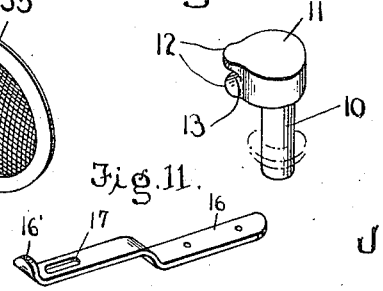

UNITED STATES PATENT OFFICE.

JOHN HEUSTIS KING, OF MOBILE, ALABAMA.

MILK-PAIL.

1,060,100.  Specification of Letters Patent.  Patented Apr. 29, 1913.

Application filed January 3, 1913. Serial No. 740,067.

*To all whom it may concern:*

Be it known that I, JOHN HEUSTIS KING, a citizen of the United States, residing at Mobile, in the county of Mobile and State of Alabama, have invented certain new and useful Improvements in Milk-Pails; and I do declare the following to be a full, clear, and exact description of the invention, such as will enable others skilled in the art to which it appertains to make and use the same.

This invention relates to improvements in milk pails.

One object of the invention is to improve and simplify the construction of the safety or non-spillable milk pails shown in my United States Patents Nos. 680,779 August 20th, 1901; 705,678, July 29th, 1902, 753,984, March 8th, 1904, 778,678, December 27th, 1904, and 807,286, December 12th, 1905.

Another object is to produce an absolutely safe or non-spillable milk pail which will be strictly sanitary and which is provided with an improved construction and arrangement of straining and filtering mechanism whereby all foreign matter will be removed from the milk before the same passes into the pail.

With these and other objects in view, the invention consists of certain novel features of construction, and the combination and arrangement of parts as will be more fully described and claimed.

In the accompanying drawings, Figure 1 is a perspective view of my improved milk pail; Fig. 2 is an enlarged central vertical section thereof; Fig. 3 is a detail perspective view of the combined valve supporting and straining member of the pail; Fig. 4 is an enlarged vertical sectional view through a portion of the valve supporting and straining member taken on the line 4—4 of Fig. 3. Fig. 5 is a detail sectional perspective view of a portion of the top of the pail and the supporting flange of the milk receiving bowl showing more particularly the manner in which the bowl is fastened to the upper end of the pail; Fig. 6 is a detail perspective view of the bowl fastening stud shown in Fig. 5; Fig. 7 is a detail perspective view of one of the fine mesh strainers of the pail; Fig. 8 is a similar view of one of the cotton or fabric straining or filtering disks employed in connection with the strainer shown in Fig. 7; Fig. 9 is a detail perspective view of the spring ring for holding the strainers and filtering disks in operative position; Fig. 10 is a similar view of a solid ring which may be permanently secured in the straining member for holding the straining devices in the openings thereof. Fig. 11 is an enlarged perspective detail of one of the catches.

Referring more particularly to the drawings, 1 denotes my improved milk pail which may be of any suitable size or shape and which has on its upper end an inwardly extending inclined annular bowl supporting flange 2, the inner edge of which is upset to form a bead 3 as shown. Secured to the outer side of the pail near the top thereof are handle attaching ears 4 to which are connected the ends of a bail shaped handle 5.

Arranged in the upper portion of the pail is a closure made in the shape of a milk receiving bowl 6 preferably of substantially hemi-spherical shape and having on its upper edge an outwardly extending annular supporting flange 7 which, when the closure is in position in the pail is adapted to overlie the flange 2 on the upper end of the pail and to thereby support the closure in the pail. The flange 7 on the bowl is bent or shaped near its inner edge to form an annular recess 8 which is adapted to receive the bead 3 formed on the edge of the flange 2. The outer edge of the flange 7 is upset to form an annular bead 9 which strengthens and imparts rigidity to the flange.

Secured at diametrically opposite points in the flange 2 of the pail are upwardly projecting bowl fastening studs 10, each having a head 11 on one side of which are laterally projecting lips 12 and an interposed recess 13 the purpose of which will be hereinafter described. Formed at diametrically opposite points in the flange 7 of the bowl 6 are short segmental key-hole shaped slots 14 which are reinforced on the upper side of the flange 7 by plates 15 having therein keyhole shaped slots which correspond to and register with the slots 14 in the flange.

The plates 15 increase in thickness or have their upper surfaces inclined from the end of the plates having the larger portions of the slots toward the opposite ends of the plates, whereby, when said larger ends of the slots are engaged with the headed upper ends of the studs 10 and the bowl 6 turned in the proper direction, the inclined or cam upper surfaces of the plates 15 will engage beneath the heads 11 of the studs and will thereby force the flange 7 of the bowl down into fluid tight engagement with the flange 2 on the pail. In order to lock the bowl in this position and to prevent the casual disengagement of the flanges 7 thereof from the studs 10, I provide spring catches 16 which are riveted or otherwise secured at one end to the flange 7 adjacent the smaller end of the slots 14, said catches having their free ends raised and provided with elongated apertures 17 which are adapted to receive the heads 11 of the bolts. The apertured ends of the catches spring into engagement with the heads and over the upper lips 12 thereon and down to a position opposite the recesses 13 formed by said lips 12. The free ends of the catches 16 when thus sprung into engagement with the heads 11 and lips 12 of the studs will be held against casual disengagement from the heads of the studs.

The tips 16' of the free ends of the catches 16 are preferably turned upwardly to a slight extent to facilitate the engagement of the spring catches with the heads of the studs 10 as will be readily understood from an inspection of Fig. 11. Secured to the flange 7 of the bowl at diametrically opposite points and preferably near the catches 16 are suitable handles 18 which are adapted to be gripped for turning the bowl 6 in the upper end of the pail when the slots in the flange of the bowl are engaged with and disengaged from the studs 10. By arranging the handles 18 adjacent to the spring catches the handles may be gripped and at the same time the thumbs of the hands engaged beneath the tips of the catches for releasing or disengaging the latter from the studs when it is desired to remove the bowl 6.

In the bottom of the bowl 6 is a centrally disposed milk discharging opening 19 the edge of which is turned downwardly to form an annular flange 20. Secured to the outer side of the flange 20 and to the adjacent outer side of the bowl 6 is an annular collar 21 on which, at diametrically opposite points are arranged radially projecting studs 22 the purpose of which will be hereinafter described. Depending from the bottom of the bowl 6 over the discharge opening 19 therein is a combined straining and valve supporting member 23 which is also preferably in the shape of a hemispherical bowl having on its upper edge an annular flange 24 radially offset to produce an annular shoulder 25 around the inner side of the upper portion of the bowl. At diametrically opposite points in the flange 24 of the bowl 23 are bayonet slots 26 which are adapted to receive the studs 22 when the flange 24 of the bowl is engaged with the collar 21 and the bowl turned thereon, thereby securing the straining and valve supporting member or bowl 23 in operative engagement with the milk receiving bowl 6.

Arranged in the milk discharging opening 19 of the bowl 6 is a conically shaped strainer 27 which is preferably formed of metal having therein perforations of suitable size through which the milk flows from the bowl 6. On the lower end of the strainer 27 is an annular radially projecting flange 28 which is engaged with the annular shoulder 25 on the upper end of the bowl 23 and is clamped between said shoulder and the lower edge of the collar 21 as shown, thus supporting and holding the strainer 27 in position in the opening 19 of the bowl 6. The lower end of the cone shaped strainer 27 forms a valve seat 29 with which is adapted to be engaged a valve 30 which is preferably in the form of a hollow metal ball and which is supported in an inoperative position when the pail stands upright, by the combined valve supporting and straining member or bowl 23 as clearly indicated in Fig. 2 of the drawings. The valve 30 when thus supported will instantly roll into fluid tight engagement with the seat 29 when the pail is tilted or upset, thereby closing the strainer 27 and the opening 19 in the bowl 6 with which the strainer is engaged and positively preventing any escape of the milk from the pail. As soon as the pail is righted the valve will drop back into the bowl 23 to permit milk to pass through the strainer 27 and opening 19 of the bowl 6 and into the strainer and valve supporting bowl 23.

The milk is discharged from the bowl 23 into the pail 1 through a series of milk discharging openings 31 formed in the bowl 23. Any desired number of milk discharging openings 31 may be provided in the bowl 23, and in forming said openings the metal of which the bowl 23 is constructed is preferably pressed outwardly to form annular flanges 32 around the openings and the outer edges of the flanges 32 are turned inwardly or upset to form annular strainer retaining beads 33. Either removably or permanently engaged with the flanges 32 of the openings 31 are strainers 34 which are preferably constructed of fine wire netting, the edges of which are secured to a binding and supporting ring 35 which, when the strainers 34 are in place, engage the retaining beads 33 on the flanges 32 of the openings 31 whereby said strainers are held in position in said openings. Also arranged in the flanges 32 of the openings 31 and at the inner sides of the strainers 34 are filtering and straining disks 36 which are preferably formed of cloth or cotton or other suitable fabric cut to correspond to the size and shape of the strainer 34. The fabric or cotton filtering disks 36 are held in position against the strainers 34 and the latter are either permanently attached or removably held in engagement with the beads 33 of the flanges 32 by spring strainer retaining rings 37 which are cut through or open to permit the same to spring apart and into engagement with the edges of the openings 31 and the inner sides of the flanges 32, and as shown in detail in Fig. 9 of the drawings, or said filtering disks may be secured in place by solid rings 37' as shown in Fig. 10 of the drawings, and which are permanently secured to the edges of the openings 31.

In the outer sides of the rings 37 and 37' are formed annular grooves 38 which are adapted to receive the inner corners of the flanges 32 when said rings are engaged with said openings. By thus fastening the filtering disks 36 and strainers 34 in the openings 31 it will be seen that the disks 36 may be readily removed from the openings 31, thus permitting the strainers to be thoroughly cleaned and the filtering disks renewed after each use of the pail. In practice the disks 36 will be supplied in packages of any desired number for use in connection with the pail.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. A milk pail having around its mouth a flange, a milk receiving bowl, a flange on said bowl to engage the flange on said pail and having therein reinforced key-hole shaped slots, headed studs rising from the flange on said paid and adapted to engage the slots, spaced lips formed on the heads of said studs, and spring catches secured to the flange on the bowl and having in their ends elongated apertures adapted to receive the heads of the studs and to spring into engagement therewith between the lips thereon.

2. A milk pail having around its mouth a flange, headed studs on said flange, a milk receiving bowl having therein a screened milk discharging opening, a supporting flange on said bowl having therein key-hole shaped slots adapted to receive said headed studs, reinforcing plates for the slots having inclined upper surfaces and key-hole shaped slots, spring catches whereof each has one end secured to the flange on the bowl adjacent a slot therein and its other end raised and provided with an opening adapted to spring over one of said headed studs when the bowl is turned, the extremity of this end of the catch being upbent, and handles mounted also on said flange adjacent said catches so that the extremity of the latter may be raised by the thumb when the hand engages a handle.

3. In a milk pail, the combination with the body having an open mouth, a cup-shaped closure having an outstanding flange overlying said mouth and an opening in its bottom surrounded by a depending flange, and a collar surrounding said flange and having diametrically disposed radially projecting pins; of a bowl whose open upper end has a radial shoulder and above the latter an offset flange provided with bayonet slots adapted to engage said studs, and whose body is pierced with discharge openings, outwardly projecting flanges around the latter having beads at their outer edges, strainers disposed within said flanged openings against said beads, and rings removably inserted in the inner ends of said flanged openings, for the purpose set forth.

In testimony whereof I have hereunto set my hand in presence of two subscribing witnesses.

JOHN HEUSTIS KING.

Witnesses:
  MOSES KOHN,
  AUBREY BOYLES.

---

Copies of this patent may be obtained for five cents each, by addressing the "Commissioner of Patents, Washington, D. C."